(12) United States Patent
Kronschnabl et al.

(10) Patent No.: US 10,399,418 B2
(45) Date of Patent: Sep. 3, 2019

(54) LINKAGE FLAP ARRANGEMENT HAVING A MAIN COVER PANEL AND AN ADDITIONAL COVER PANEL

(71) Applicant: Webasto-Edscha Cabrio GmbH, Stockdorf (DE)

(72) Inventors: Josef Kronschnabl, Stockdorf (DE); Detlev Blum, Stockdorf (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 303 days.

(21) Appl. No.: 15/344,526

(22) Filed: Nov. 6, 2016

(65) Prior Publication Data

US 2017/0129317 A1   May 11, 2017

(30) Foreign Application Priority Data

Nov. 9, 2015   (DE) .......................... 10 2015 119 261
Dec. 10, 2015   (DE) .......................... 10 2015 121 507

(51) Int. Cl.
*B60J 7/12*   (2006.01)
*B60J 7/20*   (2006.01)

(52) U.S. Cl.
CPC .............. *B60J 7/1265* (2013.01); *B60J 7/203* (2013.01)

(58) Field of Classification Search
CPC .................................. B60J 7/202; B60J 7/203
USPC ..................................................... 296/107.08
See application file for complete search history.

(56) References Cited

U.S. PATENT DOCUMENTS

| | | | |
|---|---|---|---|
| 6,682,149 B1 | 1/2004 | Guillez et al. | |
| 8,240,742 B2 * | 8/2012 | Lowak | B60J 7/20 296/107.08 |
| 2007/0152468 A1 * | 7/2007 | Cole | B60J 7/203 296/107.08 |
| 2011/0109118 A1 * | 5/2011 | Mangold | B60J 7/202 296/107.09 |

FOREIGN PATENT DOCUMENTS

| | | | | |
|---|---|---|---|---|
| DE | 29921497 U1 | 5/2000 | | |
| DE | 10001990 A1 * | 7/2001 | .............. | B60J 7/203 |
| DE | 102004038221 A1 * | 3/2006 | .............. | B60J 7/185 |
| DE | 102004038221 A1 | 3/2006 | | |
| DE | 102005043579 A1 * | 3/2007 | .............. | B60J 7/203 |
| DE | 102005051445 A1 * | 5/2007 | ............... | B60J 7/20 |
| DE | 102006051804 B3 * | 4/2008 | .............. | B60J 7/202 |

(Continued)

*Primary Examiner* — Hilary L Gutman
(74) *Attorney, Agent, or Firm* — Quarles & Brady LLP

(57) ABSTRACT

A linkage flap arrangement of a convertible vehicle includes a flap bearing mounted permanently to the vehicle. A cover panel arrangement is pivotably mounted to the vehicle by the flap bearing. The cover panel arrangement is movable between a closed position closing a linkage opening of the vehicle and an open position releasing the linkage opening and includes a main cover panel and an additional cover panel. The additional cover panel is pivotable with respect to the main cover panel and is driven by a drive motor arranged at the flap bearing. The drive motor drives a cover panel transmission when pivoting the cover panel arrangement with respect to the flap bearing, the cover panel transmission being arranged at the cover panel arrangement and driving the additional cover panel in order to pivot it with respect to the main cover panel.

10 Claims, 8 Drawing Sheets

(56) References Cited

FOREIGN PATENT DOCUMENTS

| | | | | |
|---|---|---|---|---|
| DE | 102007005639 A1 * | 8/2008 | .............. | B60J 7/202 |
| DE | 102007005639 A1 | 8/2008 | | |
| DE | 102007027859 A1 | 12/2008 | | |
| DE | 102008060538 A1 * | 6/2010 | .............. | B60J 7/203 |
| DE | 102010004963 A1 * | 7/2011 | .............. | B60J 7/203 |
| EP | 1240042 A1 | 9/2002 | | |
| EP | 1884388 A2 * | 2/2008 | .............. | B60J 7/202 |
| FR | 2890005 A1 * | 3/2007 | .............. | B60J 7/203 |
| JP | 2011148490 A * | 8/2011 | .............. | B60J 7/203 |
| JP | 2011148491 A * | 8/2011 | .............. | B60J 7/203 |

\* cited by examiner

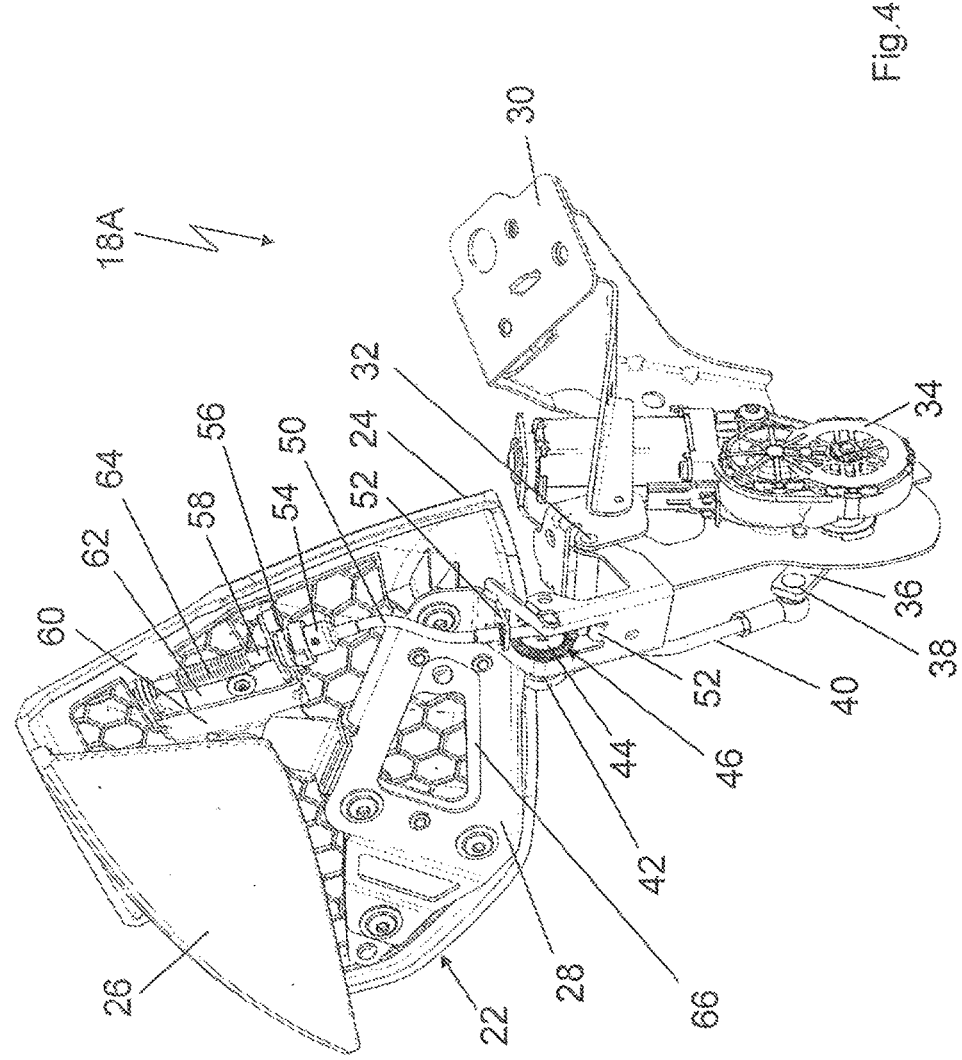

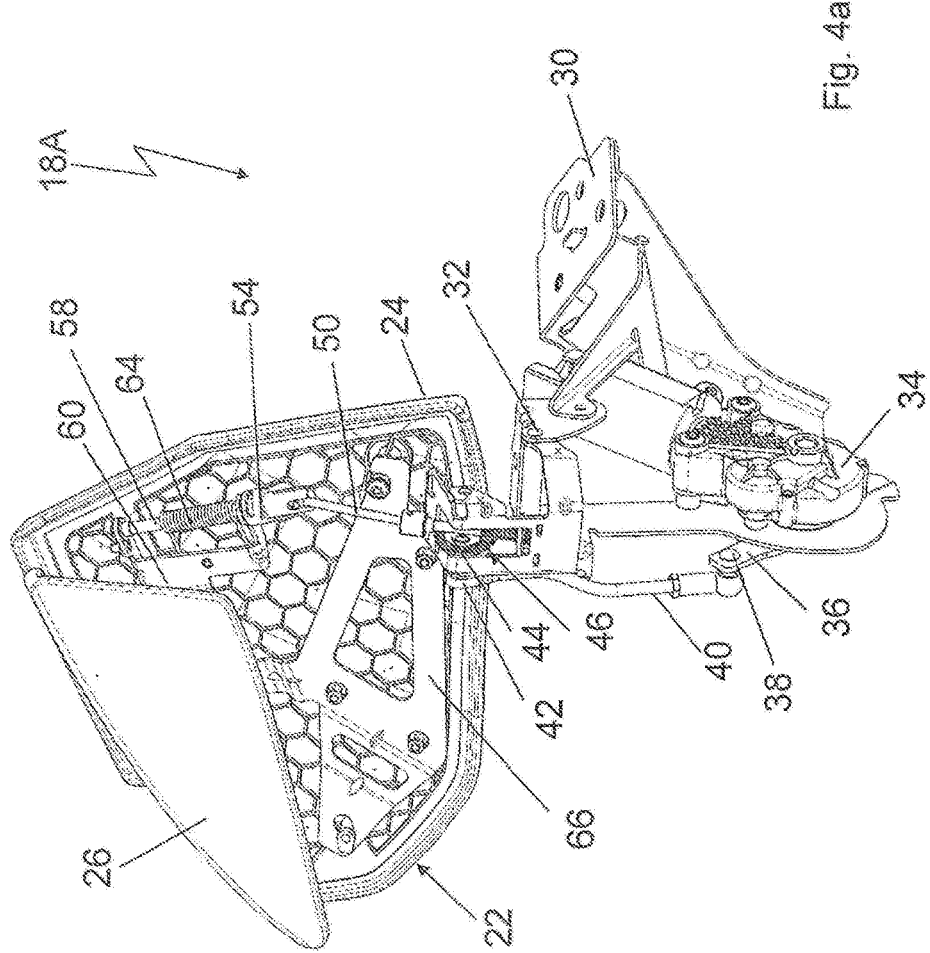

LINKAGE FLAP ARRANGEMENT HAVING A MAIN COVER PANEL AND AN ADDITIONAL COVER PANEL

CROSS REFERENCE TO RELATED APPLICATION

This application claims the priority benefit of German Patent Application No. 10 2015 119 261.6 filed on Nov. 9, 2015 and German Patent Application No. 10 2015 121 507.1 filed on Dec. 10, 2015, both of which are fully incorporated herein by reference.

STATEMENT REGARDING FEDERALLY SPONSORED RESEARCH OR DEVELOPMENT

Not applicable.

FIELD OF THE INVENTION

The invention relates to a linkage flap arrangement of a convertible vehicle.

BACKGROUND OF THE INVENTION

Such a linkage flap arrangement is known from practice and is part of a passenger car having a displaceable top which can be displaced between a closed position spanning a vehicle interior and a storage position releasing the vehicle interior upward. The top comprises a top linkage which comprises a link arrangement on each of the two sides relative to a vertical longitudinal center plane of the top, said link arrangement engaging through a linkage opening arranged in the corresponding edge area of the vehicle in the closed position of the top, said linkage opening being able to be covered by means of cover panels of the respective linkage flap arrangement. In the storage position of the top, the cover panels of the respective linkage flap arrangement close the linkage opening. In the closed portion of the top, the cover panels release the linkage opening. In order to be able to displace the cover panels between the two positions, the linkage flap arrangements each comprise an electric motor which is arranged at a flap bearing and by means of which the cover panels are pivotable. The cover panels can comprise a main cover panel and an additional cover panel which is mounted pivotable at the main cover panel. For pivoting the additional cover panel with respect to the main cover panel, the known linkage flap arrangement comprises a cable pull. However, a cable pull can become longer over time and does not allow for precise adjustments of end positions.

A linkage flap arrangement is known from DB 299 21 497 U1 which comprises a cover panel arrangement which is mounted pivotably at a cover panel carrier mounted permanently to the chassis and closes a linkage opening in a storage position of a top and completely releases the linkage opening when displacing the top. The cover panel arrangement has two cover panel elements, a first one of which is mounted at the flap bearing via a carrier arm and a second of which is mounted pivotably at the first cover panel element. The drive of the cover panel arrangement is realized by means of a drive motor which acts on the carrier arm via a drive rod and displaces the cover panel arrangement as a whole. When the top takes up the closing positing spanning the vehicle interior, the cover panel arrangement rises on a top linkage of the top, whereby the second cover panel element is pivoted with respect to the first cover panel element mounted at the flap bearing.

SUMMARY OF THE INVENTION

The object of the invention is to create a linkage flap arrangement according to the type mentioned above which allows for an accurate controlling of an additional cover panel.

The object is attained according to the invention by the linkage flap arrangement described herein. In the linkage flap arrangement according to the invention, the drive of the additional cover panel is therefore realized via a transmission which is driven by the drive motor and translates a drive torque of the drive motor into a pivoting movement of the additional cover panel with respect to the main cover panel. Therefore, the drive torque of the drive motor, which serves to pivot the cover panel arrangement as a whole, of the cover panel transmission is used for a pivoting movement of the additional cover panel with respect to the main cover panel. Hence, the additional cover panel can be controlled completely kinematically, without a cable pull or similar being necessary.

In a preferred embodiment of the linkage flap arrangement according to the invention, the drive motor drives a drive lever which is connected to a cover panel carrier of the cover panel arrangement and drives the cover panel transmission arranged at the cover panel carrier. On the one hand, the drive lever is advantageously tied to a drive shaft of the drive motor and, on the other hand, articulated at the cover panel carrier. Due to the relative rotation of the drive lever with respect to the cover panel carrier, the cover panel transmission arranged at the cover panel carrier can be driven.

In a preferred embodiment of the linkage flap arrangement according to the invention, the cover panel transmission advantageously is a gear transmission, wherein a gear of the gear transmission is connected to a drive shaft of the additional cover panel in a torque-proof manner. The gear transmission can in particular be a bevel gear having two bevel wheels, one of which is connected to the drive fever in a torque-proof manner and the other of which is connected to the drive shaft of the additional cover panel to a torque-proof manner. The bevel wheel connected to the drive lever in a torque-proof manner is an output gear which drives the drive shaft of the additional cover panel via the second bevel wheel.

In order to fulfill the installation space conditions within a linkage flap arrangement and to also compensate for tolerances, the drive shaft is a flexible shaft in a preferred embodiment of the linkage flap arrangement according to the invention, said flexible shaft being able to be diverted at least once between the transmission and the additional cover panel. Alternatively, a rigid shaft or a joint shaft can be used as a drive shaft.

In order to be able to accurately engage a gear of the cover panel transmission connected to the drive shaft in a torque-proof manner with an output gear of the drive lever, the drive shaft is preferably mounted rotatably at bearing flaps, so that the gear of the cover panel transmission connected to the drive shaft in a torque-proof manner is arranged stationary at the cover panel carrier. Of course, other bearing elements other than the bearing flaps are possible which ensure a stationary storage of the gears connected to the drive shaft, for example bearing shells having ball bearings or similar which engage around the drive shaft.

It may be necessary for the pivoting movement of the additional blend with respect to the main cover panel to not be carried out continuously synchronized with the pivoting movement of the cover panel arrangement as a whole with respect to the flap bearing. During an opening movement, for example, the cover panel arrangement is to first be pivoted as a whole while the additional cover panel on the other hand is to be pivoted starting at a certain opening degree of the cover panel arrangement with respect to the main cover panel. In this case, it is advantageous if the drive shaft is connected to the additional cover panel via a lost-motion coupling or rather a lost-motion driver.

In order to ensure that the additional cover panel remains rattle-free in its end position, in particular when the drive shaft covers an empty run with respect to the additional cover panel, an advantageous embodiment of the linkage flap arrangement according to the invention comprises a spring which pretensions the additional cover panel in direction of an end position with respect to the main cover panel and which preferably engages around a bearing pin of the additional cover panel. The spring, which can be a leg spring, can support itself with its legs at a bearing console arranged at the main cover panel, on the one hand, and at a bearing bracket connected permanently to the additional cover panel, on the other hand.

Further advantages and advantageous configurations of the subject matter of the invention can be taken from the description, the drawing and the claims.

BRIEF DESCRIPTION OF THE DRAWINGS

In the drawing, an exemplary embodiment of a linkage flap arrangement according to the invention is illustrated in a schematically simplified manner and will be explained in more detail in the following description. In the figures:

FIG. 4 shows also a view of the linkage flap arrangement corresponding to FIG. 2, however, in the open position;

FIG. 4a shows a view of the linkage flap arrangement corresponding mostly to FIG. 4, however, without cover panel carriers and having a joint shaft;

DETAILED DESCRIPTION OF AN EMBODIMENT

Figure 1:
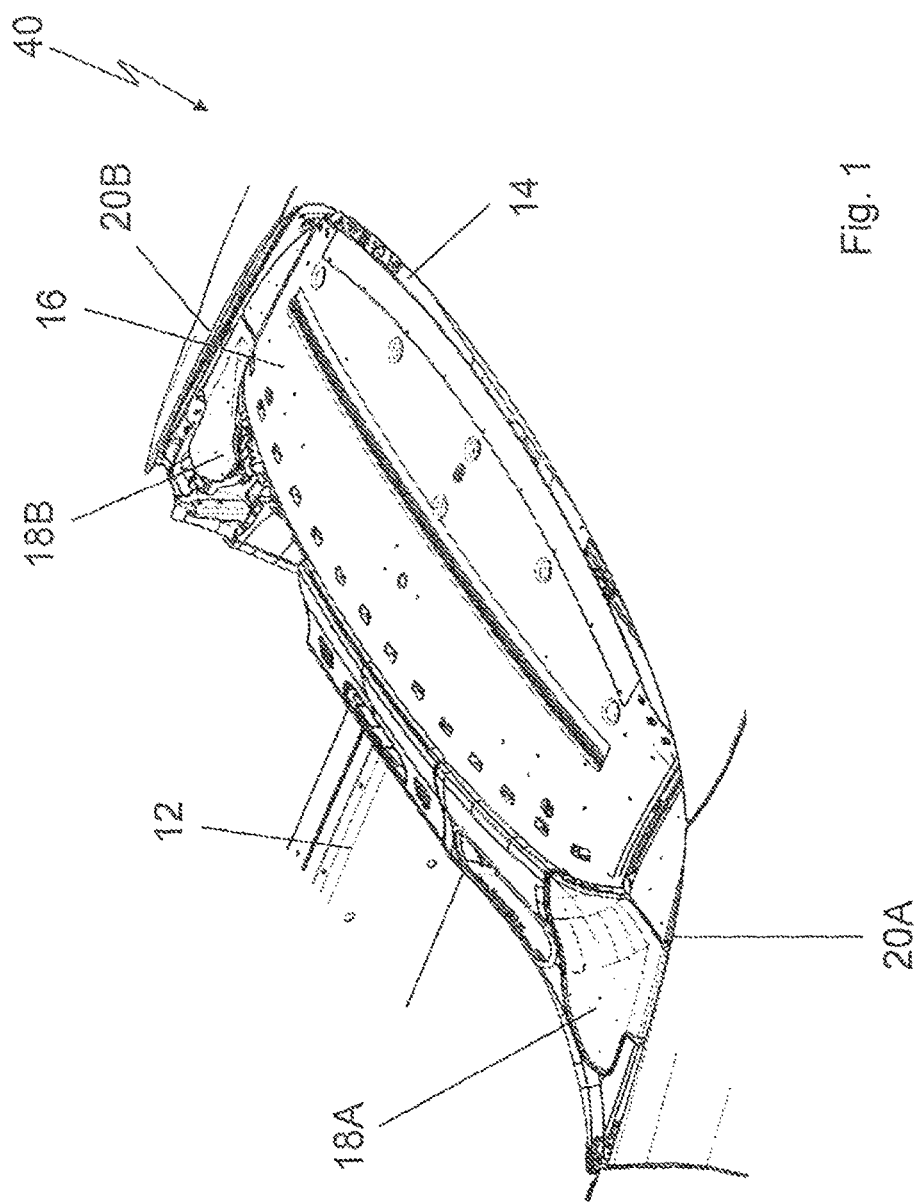
FIG. 1 shows a sectional top view on a convertible vehicle having linkage flap arrangements according to the invention.

In FIG. 1, a portion 10 at the rear end of a convertible vehicle otherwise not further illustrated is shown, said convertible vehicle being provided with a folding top which can be displaced between a closed position spanning a vehicle interior 12 and a storage position releasing the vehicle interior 12 upward. In the storage position, the folding top is received by a top storage compartment 14 at the rear end of the vehicle, said top storage compartment 14 being able to be closed by a top storage lid 15 formed by a frontal bow of the top.

Linkage flap arrangements 18A and 18B border on the top storage compartment 14 on each of the two sides relative to a vertical longitudinal center plane of the vehicle, said linkage flap arrangements 18A and 18B serving to cover corresponding chassis or rather linkage openings 20A and 20B through each of which a link arrangement of a top linkage is guided in the closed position of the top, a top covering of the folding top being spanned at said top linkage.

The linkage flap arrangements 18B and 18B are formed mirror-symmetrically to each other and are therefore only described by way of the linkage flap arrangement 18A arranged on the left side of the corresponding vehicle, relative to the forward direction of travel, in the following description. The linkage flap arrangement 18B arranged on the right side of the corresponding vehicle, relative to the forward direction of travel, is formed correspondingly and can therefore be taken directly from the description of the linkage flap arrangement 18A.

For covering the linkage opening 20A, the linkage flap arrangement 18A comprises a cover panel arrangement 22 which comprises a main cover panel 24 and an additional cover panel 26 and which is mounted pivotably at a flap bearing 30 mounted permanently at the vehicle via a cover panel carrier 28. The corresponding pivoting axis is formed by a pivoting bolt 32, to which the cover panel carrier 28 is connected.

An electric motor 34 is fastened to the flap bearing 30, said electric motor 34 driving a lever 36 which drives a drive lever 40 via a joint 38, said drive lever 40 being mounted pivotably at the cover panel carrier 28 in a point of articulation 42. The drive lever 40 is connected to a first bevel wheel 44 of a cover panel transmission 46 in a torque-proof manner via a pin defining the point of articulation 42. The first bevel wheel 44 is engaged with a second bevel wheel 48 which is connected in a torque-proof manner to a flexible drive shaft 50 guided in a shaft guide, said drive shaft 50 being mounted stationary and rotatable in the area of the cover panel transmission 46 via two bearing flaps 52.

At the end facing away from the cover panel transmission 46, the drive shaft comprises a lost-motion driver or rather a lost-motion coupling 54 which is connected to a bearing pin 58 via a driver fork 56. The bearing pin 58 in turn is connected to a bearing bracket 60 in a torque-proof manner to which the additional cover panel 26 is fastened. The bearing pin 58 is mounted pivotably at a bearing console 62 which is arranged at the inner side of the main cover panel 24 and can be part of the cover panel carrier 28.

Figure 2:
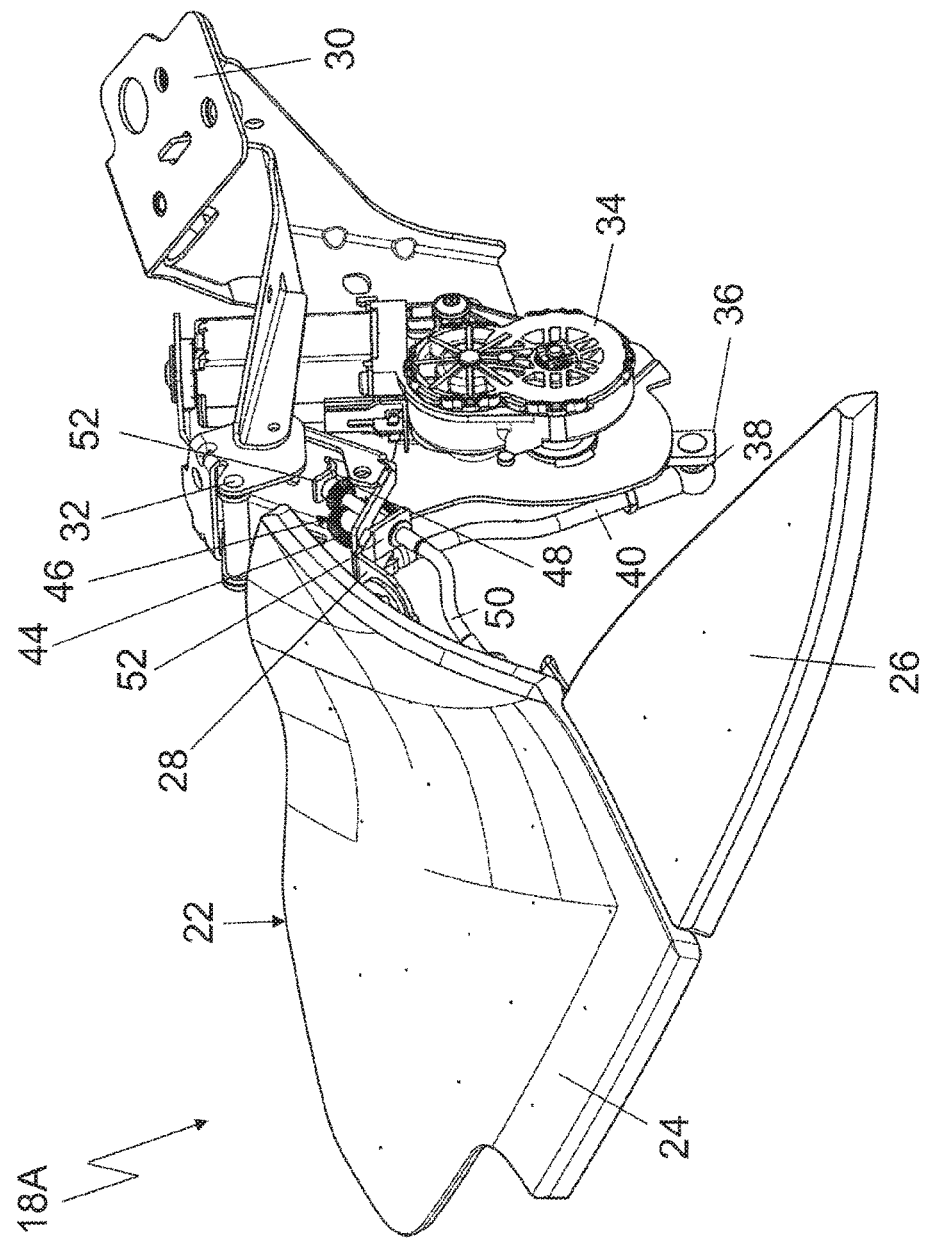
FIG. 2 shows a perspective view of one of the linkage flap arrangements in the closed position.

In order to pretension the additional cover panel 26, which is pivotable with respect to the main cover panel 24 or rather which can be pivoted with its inner side against the inner side of the main cover panel 24, into the end position shown in FIG. 2, in which the additional cover panel 26 is placed in the closed position of the linkage flap arrangement 18A, a leg spring 64 is provided which engages around the hearing pin 58 and supports itself with its legs at the bearing console 62, on the one hand, and at the bearing bracket 60 of the additional cover panel 26, on the other hand.

As can be particularly seen in FIGS. 4 and 4a, an adjustment plate 66 is arranged between the main cover panel 24 and the cover panel carrier 28, said adjustment plate 66 being fastened to the main cover panel 24 and by means of which the main cover panel 24 is fastened to the cover panel carrier 28. The adjustment plate 66 is adjustable at the cover panel carrier 28 in transverse direction with respect to the cover panel carrier 28 due to correspondingly large screw holes, so that a groove path is adjustable between the main cover panel 24 and the adjacent vehicle trim parts. The adjustment of the groove path is realized in the vertical direction of the connecting screws by means of spacer washers.

Alternatively, the main cover panel 24 can also be positioned opposite the adjustment plate 66 for adjusting the groove path.

For adjusting the groove path between the additional cover panel 26 and the adjacent vehicle trim parts, a corresponding adjustment plate can be arranged between the bearing bracket 60 and the additional cover panel 26.

As can be further seen in FIG. 4a, the drive shaft 50 can also be a joint shaft which replaces the flexible shaft shown in FIG. 4.

If the linkage flap arrangement 18A is to be brought into the open position shown in FIG. 4 from the closed position shown in FIG. 2 by means of the electric motor 34, the cover panel arrangement 22 as a whole is first pivoted by means of the electric motor 34 via the drive lever 40. Due to the lost-motion coupling 54, the additional cover panel 26 remains in its relative position with respect to the main cover panel 24, even though the drive shaft 50 is driven via the cover panel transmission 46. Only after covering the empty run determined by the lost-motion coupling 54, the additional cover panel 26 is pivoted with respect to the main cover panel 24 into the end position shown in FIG. 4, meaning with its inner side against the inner side of the main cover panel 24, via the drive shaft 50.

The adjustment of the linkage flap arrangement 18A from the open position into the closed position is carried out analogously in reversed manner.

The invention claimed is:

1. A linkage flap arrangement of a convertible vehicle, said linkage flap comprising:
    a flap bearing mountable to the vehicle;
    a cover panel arrangement pivotably mounted by said flap bearing, said cover panel arrangement being movable between a closed position closing a linkage opening of the vehicle and an open position releasing the linkage opening, said cover arrangement including a main cover panel and an additional cover panel, said additional cover panel being pivotable with respect to the main cover panel;
    a drive motor arranged at the flap bearing; and
    a cover panel transmission driven by said drive motor when pivoting the cover panel arrangement with respect to the flap bearing, said cover panel transmission being arranged at the cover panel arrangement and driving the additional cover panel in order to pivot the additional cover panel with respect to the main cover panel.

2. The linkage flap arrangement according to claim 1, in which the drive motor drives a drive lever connected to a cover panel carrier of the cover panel arrangement and drives the cover panel transmission arranged at the cover panel carrier.

3. The linkage flap arrangement according to claim 1, in which a spring pretensions the additional cover panel in a direction of an end position with respect to the main cover panel.

4. The linkage flap arrangement according to claim 1, in which the main cover panel is arranged on an adjustment plate which enables an adjustment and positioning of the main cover panel with respect to the flap bearing.

5. The linkage flap arrangement according to claim 3, in which the main cover panel engages around a bearing pin of the additional cover panel.

6. A linkage flap arrangement of a convertible vehicle, said linkage flap comprising:
    a flap bearing mountable to the vehicle;
    a cover panel arrangement pivotably mounted by said flap bearing, said cover panel arrangement being movable between a closed position closing a linkage opening of the vehicle and an open position releasing the linkage opening, said cover arrangement including a main cover panel and an additional cover panel, said additional cover panel being pivotable with respect to the main cover panel;
    a drive motor arranged at the flap bearing; and
    a cover panel transmission driven by said drive motor when pivoting the cover panel arrangement with respect to the flap bearing, said cover panel transmission being arranged at the cover panel arrangement and driving the additional cover panel in order to pivot the additional cover panel with respect to the main cover panel, wherein the cover panel transmission is a gear transmission and a gear of the gear transmission is connected to a drive shaft of the additional cover panel in a substantially torque-proof manner.

7. The linkage flap arrangement according to claim 6, in which the gear transmission is a bevel gear having two bevel wheels of which one of the two bevel wheels is connected to the drive lever in a substantially torque-proof manner and the other of the two bevel wheels is connected to the drive shaft in a substantially torque-proof manner.

8. The linkage flap arrangement according to claim 6, in which the drive shaft is a flexible shaft.

9. The linkage flap arrangement according to claim 6, in which the drive shaft is mounted rotatably at bearing flaps, so that the gear of the cover panel transmission connected to the drive shaft in a substantially torque-proof manner is stationary with respect to the cover panel carrier.

10. The linkage flap arrangement according to claim 6, in which the drive shaft is connected to the additional cover panel via a lost-motion coupling.

* * * * *

UNITED STATES PATENT AND TRADEMARK OFFICE
CERTIFICATE OF CORRECTION

PATENT NO. : 10,399,418 B2  
APPLICATION NO. : 15/344526  
DATED : September 3, 2019  
INVENTOR(S) : Josef Kronschnabl Page 1 of 1

It is certified that error appears in the above-identified patent and that said Letters Patent is hereby corrected as shown below:

In the Specification

Column 1, Line 40, "portion" should be --position--.

Column 1, Line 53, "DB" should be --DE--.

Column 2, Line 42, "fever" should be --lever--.

Column 2, Line 44, "panel to a" should be --panel in a--.

Column 3, Line 50, "cat" should be --cut--.

Figure 3:
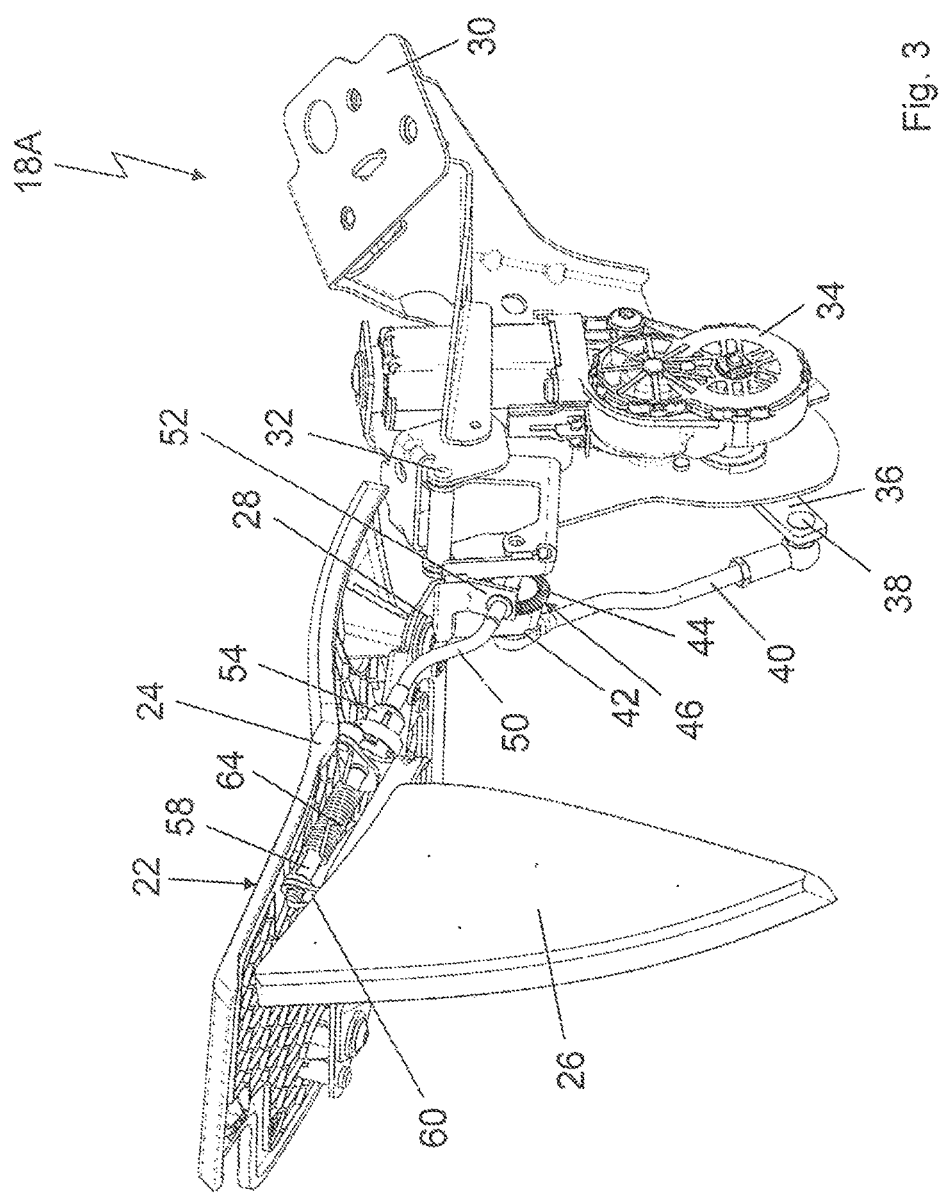
FIG. 3 shows a view of the linkage flap arrangement corresponding to FIG. 2, however, in an intermediary position.
Figure 5:
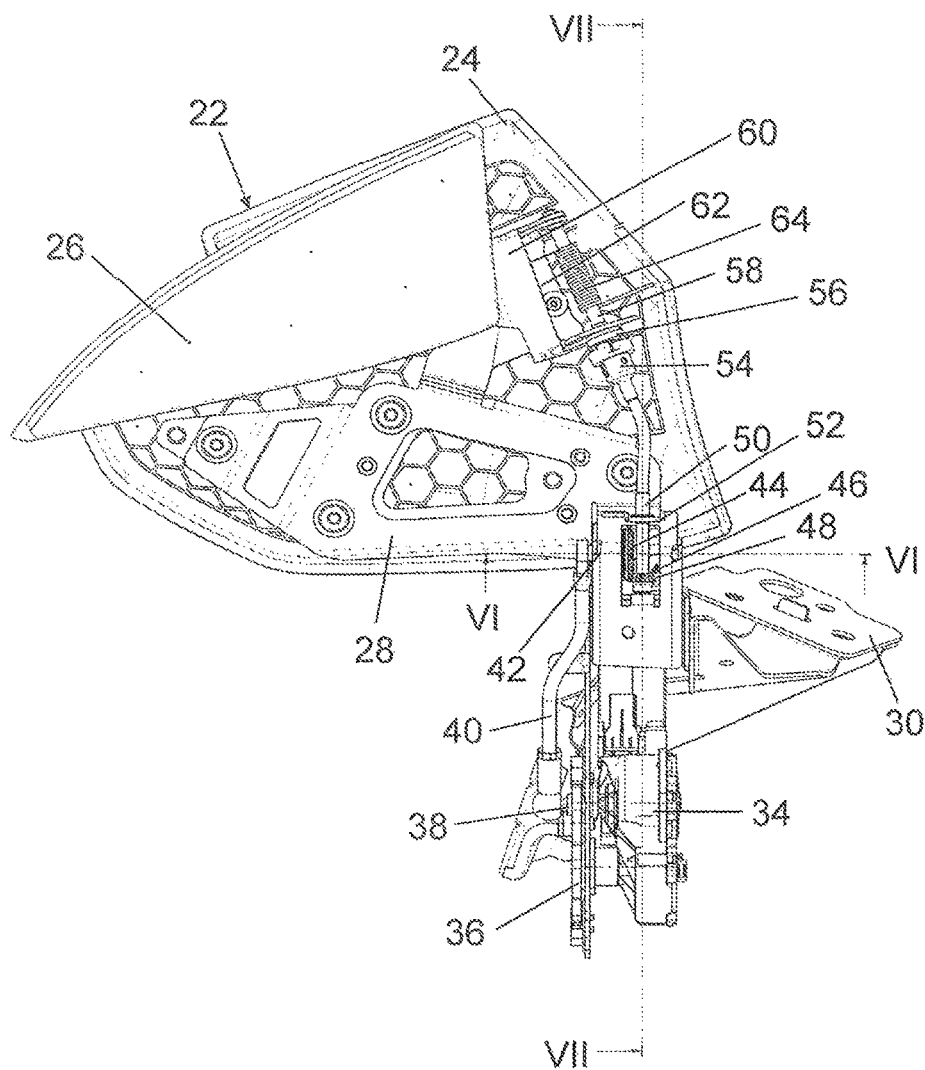
FIG. 5 shows a side view of the linkage flap arrangement in its open position.
Figure 6:
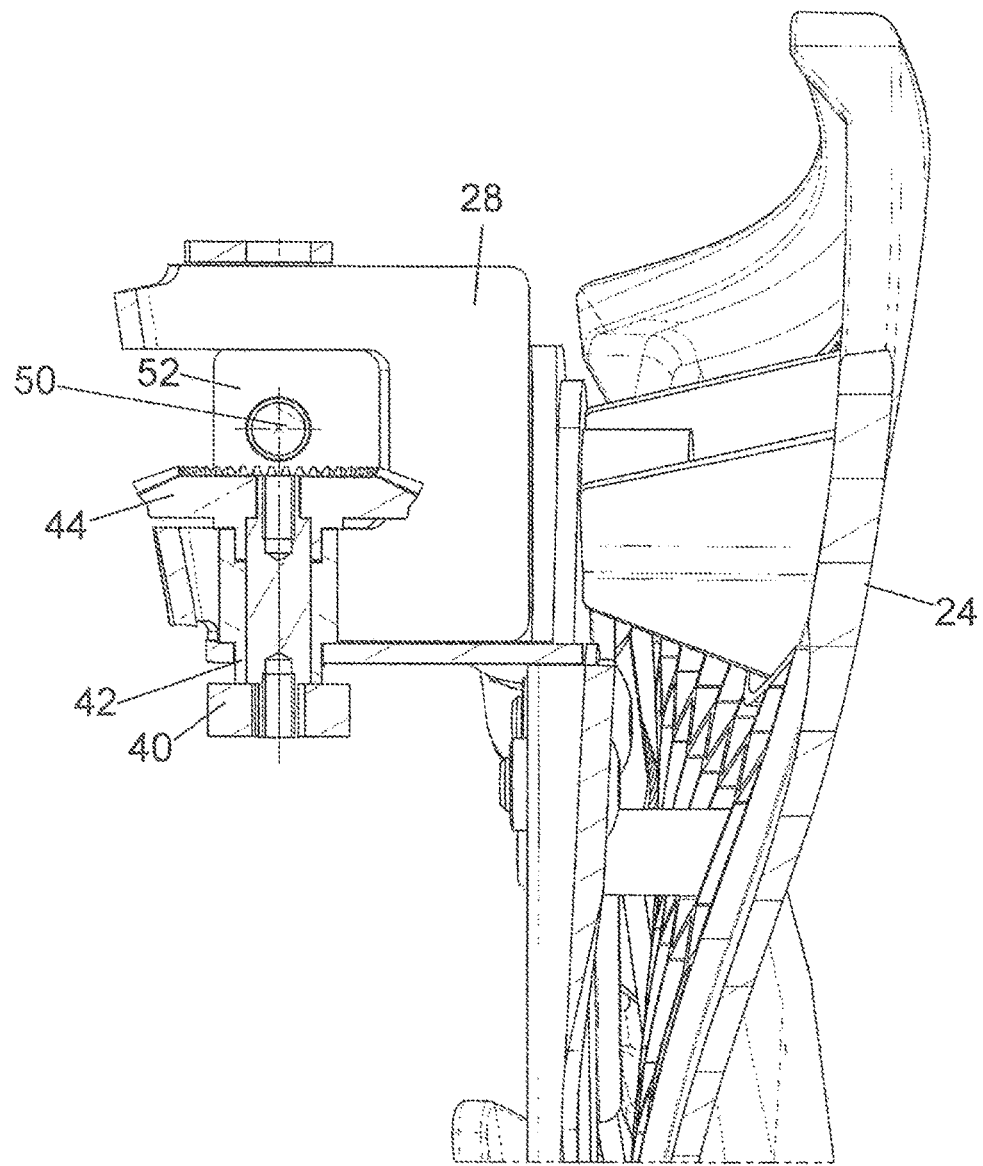
FIG. 6 shows a cat through the linkage flap arrangement along the line VI-VI in FIG. 3.
Figure 7:
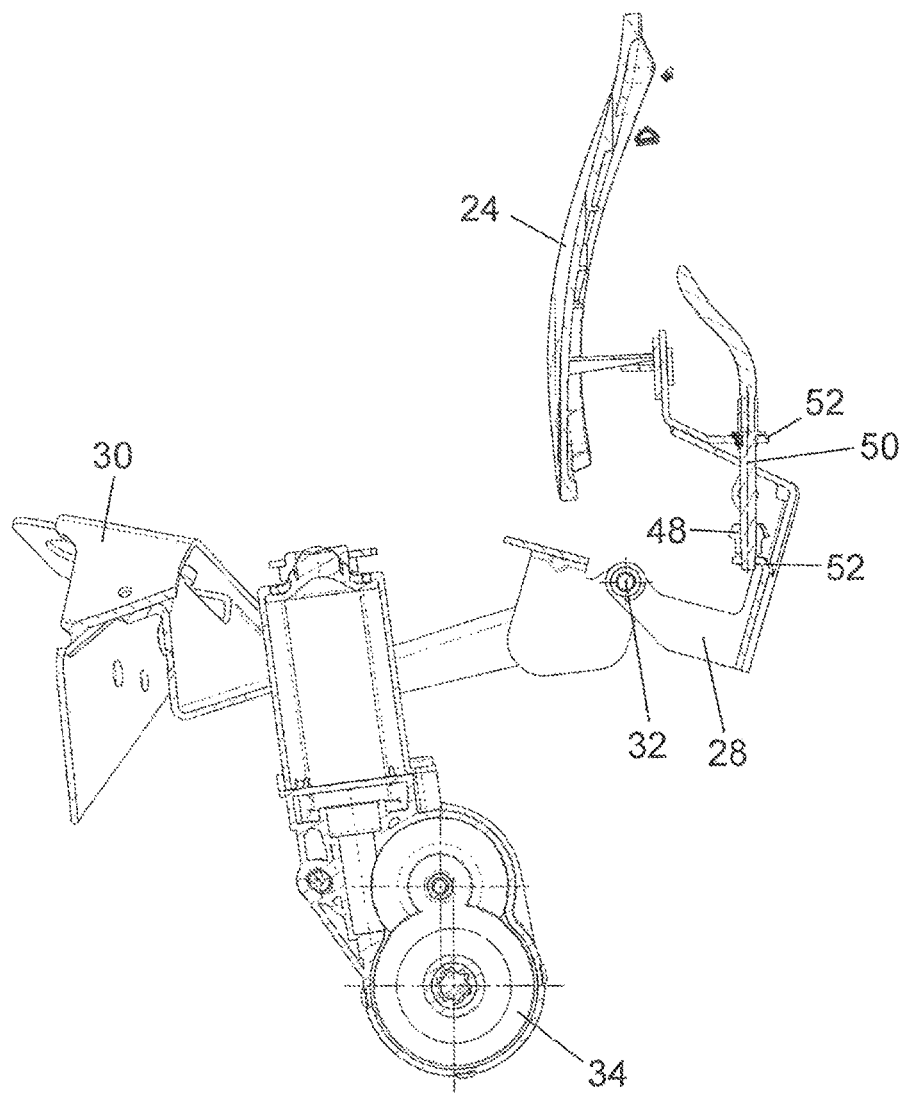
FIG. 7 shows a cut through the linkage flap arrangement along the line VII-VII in FIG. 5.

Column 3, Line 51, "FIG. 3" should be --FIG. 5--.

Column 4, Line 56, "hearing" should be --bearing--.

Signed and Sealed this  
Twenty-ninth Day of October, 2019

Andrei Iancu  
*Director of the United States Patent and Trademark Office*